April 19, 1960  R. EBBERT  2,933,204
MEANS FOR ORIENTATING STACKED DISCS
Filed Dec. 9, 1957
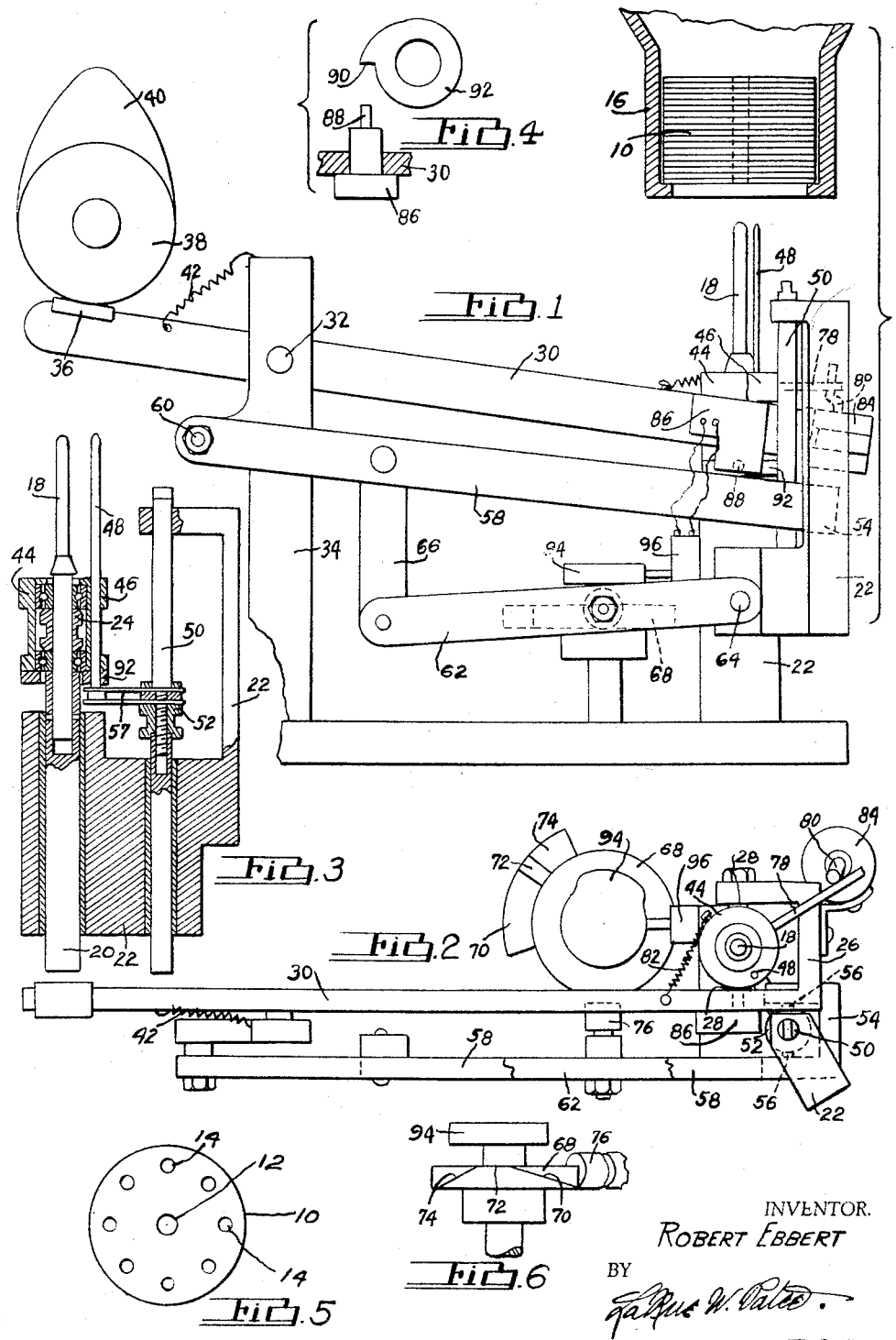
INVENTOR.
ROBERT EBBERT
BY
ATTORNEY

United States Patent Office 2,933,204
Patented Apr. 19, 1960

2,933,204

MEANS FOR ORIENTATING STACKED DISCS

Robert Ebbert, Rochester, Mich.

Application December 9, 1957, Serial No. 701,567

4 Claims. (Cl. 214—1)

This invention relates to a method and means for orientating and assembling a plurality of discs such as used in the assembly of electric motor armatures. More specifically the invention pertains to means for aligning circumferential holes or slots of one disc with the holes or slots of another disc with respect to a central common axis.

It is an object of the present invention to provide a means for angularly moving a stack of discs by an angularly movable pin which is advanced through the stack.

Another object of the invention is to provide automatic means for orientating the discs which will permit the operator to select a group of discs, apply the group to the device, and then remove the orientated discs from the device, thus reducing the cost and labor of assembly.

Other objects and advantages of the present invention will be more apparent from the following description taken in connection with the accompanying drawings wherein a preferred embodiment of the invention is clearly shown and wherein:

Fig. 1 is a side elevational view of the improved mechanism for orientating stacked discs;

Fig. 2 is a top plan view of the mechanism shown in Fig. 1;

Fig. 3 is an enlarged cross sectional view of the reciprocating pins and their operating mechanism;

Fig. 4 is a top plan view of the retaining mechanism for preventing oscillation;

Fig. 5 is a top plan view of one of the discs; and

Fig. 6 is a side elevational view of the raising cam and its follower.

The device herein illustrated is a portion of an automatic machine for performing several operations or stages of forming electric motor parts, but the present invention relates to that portion or stage of the machine for bringing about the alignment of a line of holes through a stack of discs.

The discs 10 selected for illustrating the invention are shown in Fig. 5 and are provided with a central armature shaft hole 12 and a plurality of stud holes 14 circumferentially spaced around and adjacent to the outer periphery of the disc. These discs are arranged in groups and may include from five to thirty or more depending upon the size and other characteristics of the motor. They are fed into a hopper 16 in predetermined numbers forming a group with the holes 14 out of alignment.

That portion of the machine for orientating the discs to properly align the stud holes 14 includes a reciprocating guide pin 18 for entering the central hole 12 in the stack of discs carried by the hopper 16. The pin 18 is provided with an extended guide portion 20 which is slidably mounted in guide bushing 22. A collar 24 is fixed to the pin 18 and a yoke 26 having oppositely disposed pins 28 engages the collar 24 for reciprocating the pin 18. The yoke is secured to an arm 30 which is pivoted at 32 to a support 34. The arm 30 is extended beyond the pivot 32 and terminates in a cam contact surface 36. A cam 38 having a high lobe 40 urges the arm extension downwardly pivoting the arm 30 to raise the pin 18. A tension spring 42 urges the arm extension upwardly.

Rotatably mounted on the pin 18 and axially movable with the pin and collar 24 is a sleeve 44 having guide bushings 46 spaced radially from the axis of the pin 18 and sleeve 44. These bushings slidably support an axially movable index pin 48. An axially slidable rod 50 is supported in the guide bushing 22 and is provided with a collar 52 fixed thereto. The collar is connected to a yoke 54 having oppositely disposed pins 56 in engagement with the collar for reciprocating the rod 50. A flat spring steel plate 57 forms a flexible connection between the lower end of the index pin 48 and the collar 52. An arm 58 has one end pivotally mounted at 60 on the support 34 and its opposite end carries the yoke 54. The arm 58 is pivoted about its pivot 60 by the movement of an arm 62 pivoted at 64 and connected to the arm 58 by a link 66. The arm 62 is pivoted upwardly by a rotatable member 68 having a portion of its upper surface provided with a cam surface which has a rise portion 70, a flat or dwell portion 72, and a fall portion 74, better shown in Fig. 6. A cam follower 76 is carried by the arm 62.

The index pin 48 and sleeve 44 are caused to oscillate about the axis of the pin 18 by a radial rod 78 fixed to the sleeve 44 and held in contact engagement with a rotatable crank arm 80 by a spring 82. The crank arm 80 is rotatably driven by a motor 84. The oscillating movement is intermittently stopped while the index pin 48 is moved downwardly and retracted from the stack of discs. This is done by a solenoid 86 causing a spring pressed plunger 88 to be positioned in the path of a notched portion 90 in a plate 92 secured to the lower end of the sleeve 44, better shown in Fig. 4. The solenoid retracts the plunger 88 permitting the radial rod 78 to be in contact with the crank arm 80. Timing of the solenoid operation is done by a cam 94 carried by the cam 68 which operates a switch 96 electrically connected to the solenoid 86.

In the operation of the disc indexing device, the desired number of discs are fed into the hopper 16, automatically or manually, and the high lobe 40 of cam 38 turning in a clockwise direction, causes the arm 30 to be pivoted, raising the guide pin 18 through armature hole 12 of the stacked discs and at the same time the guide pin 18 has engaged the uppermost disc of the stack, the oscillating index pin 48 engages the lower disc of the stack causing the stack to be spasmodically lifted from the lower surface of the hopper. The index pin initially carries the weight of the stack until such a time as the pattern of oscillation of the index pin 48 finds a hole 14 in the contact disc, at which time the disc becomes indexed to the index pin 48 and falls to the lower surface of the hopper or to the disc that has become indexed and fallen before it. The angular sweep of the oscillating index pin 48 is determined by the angular distance between the stud holes 14 of the disc. When the pins 18 and 48 have passed through the uppermost disc they start their recession, at which time oscillation of the index pin 48 is restricted by the plunger 88 holding the plate 92 and sleeve 44 against oscillation with the rod 78 held out of contact with the rotating crank arm 80. The non-oscillating index pin 48 causes the now indexed stack to be left at the bottom of the hopper, always in the same position with respect to angular location of the holes 14.

While the invention has been described consisting of parts quite complex, due to its adaptation to a complex machine, it will be understood that the essential parts are quite simple and that various changes, including the size, shape and arrangement of parts may be made without departing from the spirit of the invention and it is not my intention to limit its scope other than by the terms of the appended claims.

I claim:

1. Apparatus for orientating a stack of discs having holes therethrough in circumferentially spaced relation comprising, means for aligning said discs in stacked relation about a common axis, a reciprocating indexing pin for progressively entering and retracting from one of the holes in each disc, means for oscillating the axis of said indexing pin about the axis of said aligning means during its entrance through the holes in each disc, the angularity of oscillation being at least equal to the spacing of the circumferentially spaced holes, and means for restriction of oscillatory movement of the indexing pin during its retraction.

2. Apparatus for orientating a stack of discs having a central hole and radially spaced holes therethrough in circumferentially spaced relation comprising, a reciprocating guide pin for entering and retracting from the central hole in the stack of discs, a reciprocating indexing pin for entering and retracting from one of the radially spaced holes in each disc, oscillating means for said index pin, the angularity of oscillation being at least equal to the spacing of the radially spaced holes, and means for restricting oscillation of said indexing pin during its movement of retraction from said holes.

3. Apparatus for orientating a stack of discs having a central hole and radially spaced holes therethrough in circumferentially spaced relation comprising, a reciprocating guide pin for entering and retracting from the central hole in the stack of discs, a reciprocating indexing pin for entering and retracting from one of the radially spaced holes in each disc, means for restriction of oscillatory movement of the indexing pin during its retraction, and means for oscillating the axis of said indexing pin about the axis of said guide pin during its entrance through the radially spaced hole in each disc, the angularity of oscillation being substantially equal to the circumferential spacing of said radially spaced holes.

4. Apparatus for orientating a stack of discs having a central hole and radially spaced holes therethrough in circumferentially spaced relation comprising, a cam operated reciprocating guide pin for entering and retracting from the central hole in the stack of discs, a reciprocating index pin for entering and retracting from one of the radially spaced holes in each disc, a reciprocating rod having its axis parallel to axes of said guide pin and said index pin, cam means for reciprocating said rod, resilient means connecting said rod to said index pin, means for oscillating the axis of said index pin about the axis of said guide pin during its entrance into holes through the stack of discs, the angularity of oscillation being at least equal to the spacing of the radially spaced holes, and means for restriction of oscillatory movement of the indexing pin during its retraction.

References Cited in the file of this patent

UNITED STATES PATENTS

| 663,694 | Chilton | Dec. 11, 1900 |
| 2,304,607 | Sleeter | Dec. 8, 1942 |
| 2,783,897 | Farquharson | Mar. 5, 1957 |